(12) United States Patent
Yu et al.

(10) Patent No.: US 8,731,303 B2
(45) Date of Patent: May 20, 2014

(54) VANISHING POINT ESTIMATION SYSTEM AND METHODS

(75) Inventors: Liangyin Yu, Fremont, CA (US); Ming-Chang Liu, San Jose, CA (US)

(73) Assignee: Sony Corporation, Tokyo (JP)

( * ) Notice: Subject to any disclaimer, the term of this patent is extended or adjusted under 35 U.S.C. 154(b) by 691 days.

(21) Appl. No.: 12/962,634

(22) Filed: Dec. 7, 2010

(65) Prior Publication Data

US 2012/0141015 A1 Jun. 7, 2012

(51) Int. Cl.
*G06K 9/46* (2006.01)
*G06K 9/66* (2006.01)

(52) U.S. Cl.
USPC .................................................. 382/190

(58) Field of Classification Search
CPC ... G06T 7/0061; G06T 7/0063; G06T 7/0083; G06T 7/0085
See application file for complete search history.

(56) References Cited

U.S. PATENT DOCUMENTS

| | | | |
|---|---|---|---|
| 6,591,005 B1 | 7/2003 | Gallagher | |
| 6,778,699 B1 * | 8/2004 | Gallagher | 382/165 |
| 2008/0260256 A1 | 10/2008 | Zeng et al. | |
| 2009/0208128 A1 * | 8/2009 | Hayashi et al. | 382/256 |

OTHER PUBLICATIONS

Tardiff, "Non-Iterative Approach for Fast and Accurate Vanishing Point Detection", Oct. 2, 2009, IEEE 12 Int. Conf. on Computer Vision 2009, p. 1250-1257.*
Wang et al., "Lane detection and tracking using B-Snake", Apr. 1, 2004, Image and Vision Computing, vol. 22, iss. 4, p. 269-280.*
Dias et al., "Fusion of Intensity and Range Data for Improved 3D Models", Oct. 10, 2001, Proceedings of Int. Conf. on Image Processing 2001, vol. 3, p. 1107-1110.*
Hong et al., "Adaptive Edge Detection for Real-Time Video Processing using FPGAs", 2005, Altera. p. 1-7.*
Carreira-Peripinan, "Fast nonparametric clustering with Gaussian blurring mean-shift", 2006, Proc. of the 23rd Int. Conf. on Machine Learning, p. 153-160.*
Rother, C.—"A new Approach in Vanishing Point Detection in Architectural Environments" —Journal Image and Vision Computing (Special Issue on BMVC), vol. 20, No. 9-10, pp. 647-656.
Barinova, O. et al.—"Learning class specific edges for vanishing point estimation"—GraphiCon 2007, Jun. 23-27, 2007, Moscow, Russia, 4 pages.
Kong, H. et al.—Vanishing point detection for road detection—Proc. IEEE Conf. Computer Vision Pattern Recognition, 2009, pp. 96-103.
Almansa, A. et al.—"Vanishing point detection without any a priori information"—IEEE Trans. on Pattern Analysis and Machine Intelligence, vol. 25, issue 4, Apr. 2003, 17 pages.
van den Heuvel, F.A. "Vanishing Point Detection for Architectural Photogrammetry"—International archives of photogrammetry and remote sensing, 1998, vol. 32, part 5, pp. 652-659.

* cited by examiner

*Primary Examiner* — John Strege
*Assistant Examiner* — Timothy Choi
(74) *Attorney, Agent, or Firm* — John P. O'Banion

(57) ABSTRACT

Systems and methods are disclosed for estimating a vanishing point within an image, including: programming executable on a processor for computing line segment estimation of one or more lines in an image, wherein one or more of the lines is made up of multiple line segments as a single least-mean-square-error (LMSE) fitted line. Additionally, the one or more lines having multiple line segments are represented as a single least-mean-square-error (LMSE) fitted line, and the one or more lines are intersected to locate a vanishing point in a density space.

26 Claims, 13 Drawing Sheets

VANISHING POINT ESTIMATION SYSTEM AND METHODS

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to image processing, and more particularly to processing of image line structures.

2. Description of Related Art

Of increasing importance is the need to detect vanishing points in the presence of parallel line segments in an image. Vanishing points may be used to calibrate cameras and detect road and obstacles for automatic navigation. As shown in FIG. 1, a vanishing point is the intersection point 14 in the image plane 10, 12 of all parallel lines in 3-D space when imaged by a perspective (e.g., pin-hole) camera. Each set of parallel lines has its own vanishing point. FIG. 2 illustrates three images 16, 18, and 20 having challenges for determining a vanishing point. Image 20 is representative of multiple vanishing points in an image, e.g. different sets of parallel lines 24 may produce multiple vanishing points. Other difficulties include images not having enough lines to compute a vanishing point, errors in estimating lines, and clutters and ill-defined lines 22 in images 16 and 18 may appear as computation noise.

One attempt to address vanishing point estimation is through Hough transform. However, this is a computationally expensive technique that has insufficient accuracy, and requires many lines. Another attempt is Bayesian with RANSAC, which is also highly complex. While shorter lines may be used, it still requires many lines to work.

Accordingly, an object of the present invention is to provide improved systems and methods for accurately detecting vanishing points in a variety of images, including images with clutters and ill-defined lines, while requiring minimal computational power. At least some of these objectives will be met in the following disclosure.

BRIEF SUMMARY OF THE INVENTION

The present invention relates to a system and method of automatically and accurately detecting vanishing points in the presence of parallel line segments. An automatic method is disclosed for detecting a vanishing point in images that have many sets of parallel line segments. The line segments are analyzed carefully to filter out spurious noises and a density space for line intersections is constructed. Maximum points are searched in this space to identify potential vanishing points. A separate validation process may be executed to ensure the validity of the vanishing point.

The present invention also describes a new algorithmic method used for detecting vanishing points. The algorithm comprises the steps of computing accurately line segments at multiple scales, representing each line with multiple segments (polyline) by a single least-mean-square-error (LMSE) fitted line, intersecting all the lines and locating the vanishing point in a density space, and validating the result. A second phase computation may be employed for ill-defined and coarse lines, if necessary.

An aspect of the invention is a system for estimating a vanishing point within an image, comprising: (a) a processor configured for processing pixels of an image; (b) programming executable on said processor for: (i) computing line segment estimation of one or more lines in said image; (ii) wherein one or more of said lines comprise multiple line segments as a single least-mean-square-error (LMSE) fitted line; (iii) representing said one or more lines having multiple line segments as a single least-mean-square-error (LMSE) fitted line; and (iv) intersecting the one or more lines to locate a vanishing point in a density space.

Another aspect is a method for estimating a vanishing point within an image, comprising: (a) inputting an image into a memory module, the memory module coupled to a processor; (b) detecting a vanishing point within the image with said processor according to the steps of: (i) computing line segment estimation of one or more lines in said image; (ii) wherein one or more of said lines comprise multiple line segments as a single least-mean-square-error (LMSE) fitted line; (iii) representing said one or more lines having multiple line segments as a single least-mean-square-error (LMSE) fitted line; and (iv) intersecting the one or more lines to locate a vanishing point in a density space.

Another aspect is an apparatus for estimating a vanishing point within an image, comprising: (a) a processor configured for processing pixels of an image; (b) programming executable on said processor for: (i) computing an edge gradient magnitude of the image; (ii) performing non-maximum suppression of the edge gradient to generate one or more edges having a single pixel width; (iii) finding the endpoints of said edges and tracking said edges; and (iv) filtering the lines associated with said edges based on a predetermined minimum length; (v) wherein one or more of said lines comprise multiple line segments as a single least-mean-square-error (LMSE) fitted line; (vi) representing said one or more lines having multiple line segments as a single least-mean-square-error (LMSE) fitted line; (vii) intersecting the one or more lines; (viii) computing a point density from the intersected lines; and (ix) searching for one or more maximum density points Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Referring more specifically to the drawings, for illustrative purposes the present invention is embodied in the apparatus generally shown in FIG. 3 through FIG. 16. It will be appreciated that the apparatus may vary as to configuration and as to details of the parts, and that the method may vary as to the specific steps and sequence, without departing from the basic concepts as disclosed herein.

Figure 1:
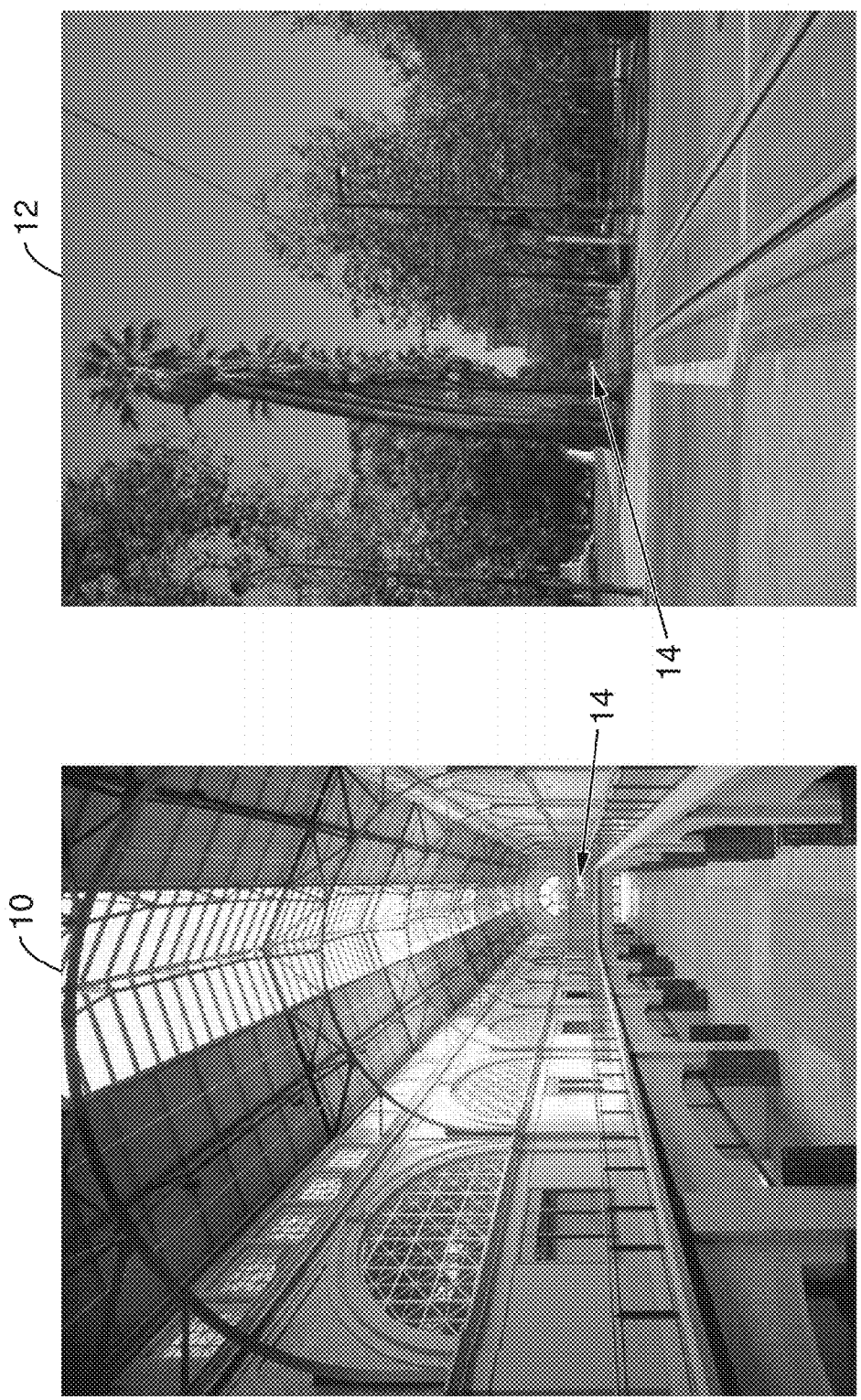
FIG. 1 illustrates a pair of images having vanishing points from a series of parallel lines.
Figure 2:
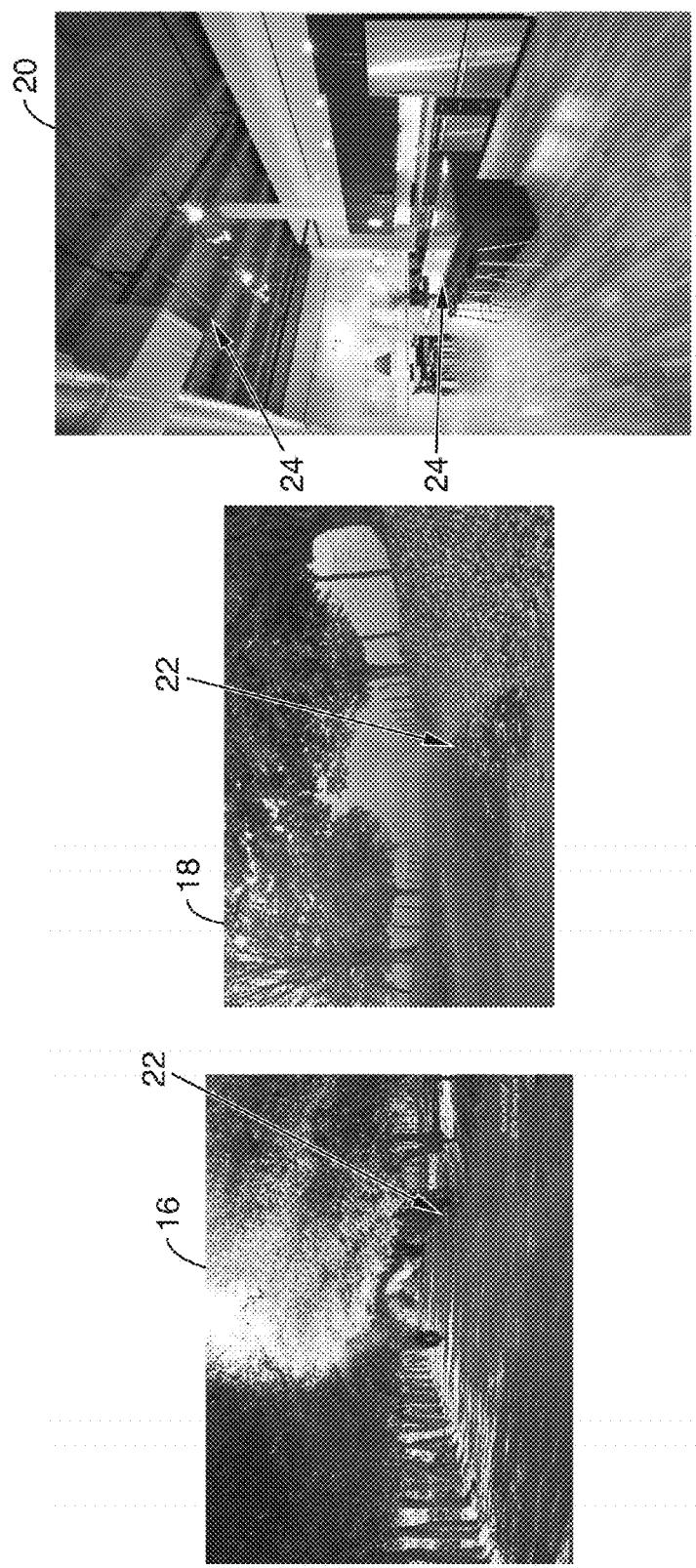
FIG. 2 illustrates three images having challenges for determining vanishing points.
Figure 3:
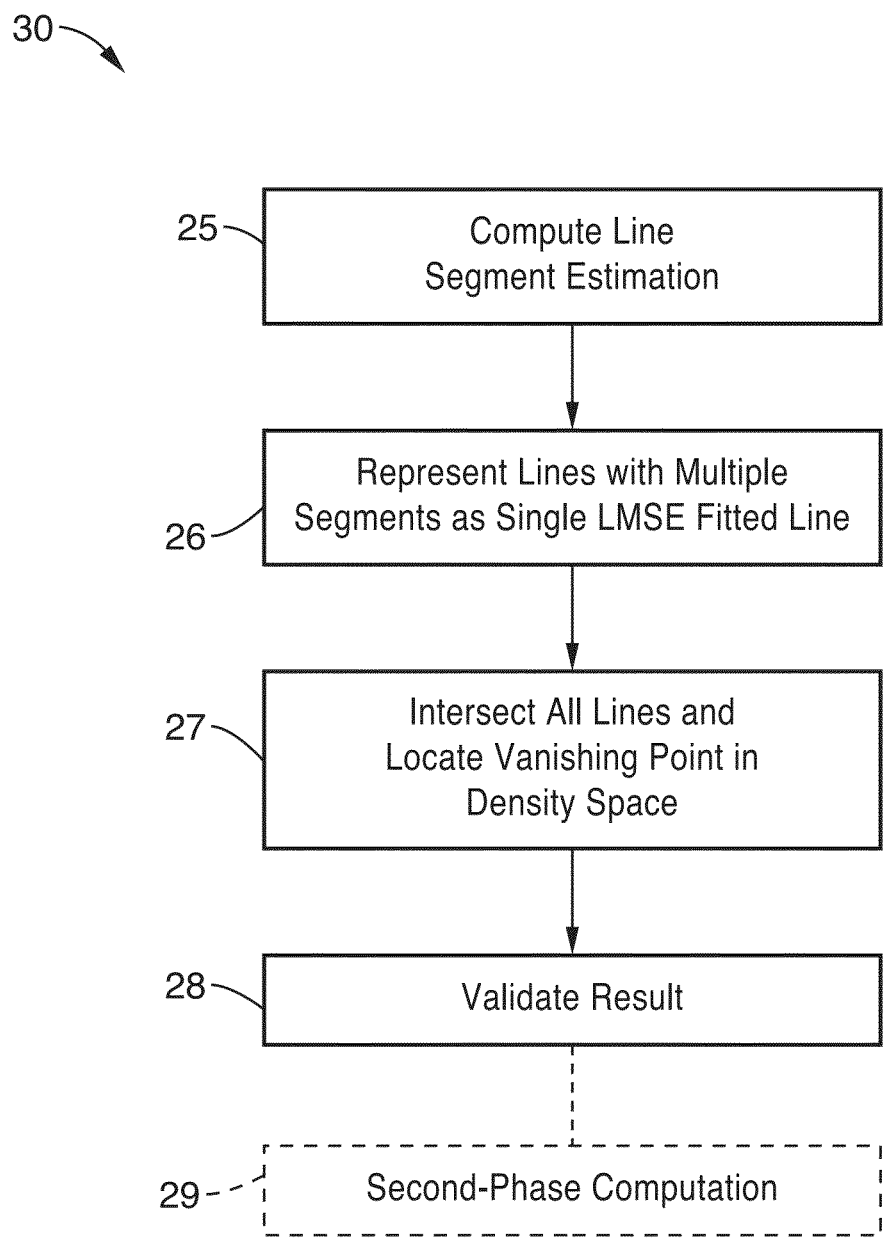
FIG. 3 illustrates a high-level flow diagram of an algorithm for determining vanishing points in an image in accordance with the present invention.

FIG. 3 illustrates a high-level flow diagram of algorithm 30 for determining vanishing points in an image in accordance with the present invention. First, at step 25, the algorithm accurately computes line segments at multiple scales. At step 26 the algorithm represents each line with multiple segments (e.g. polylines) by a single least-mean-square-error (LMSE) fitted line. All the lines are then intersected to locate the vanishing point in a density space at step 27. The result is then validated at step 28. Optionally, a second phase computation is employed for ill-defined and coarse lines, if necessary, at step 29.

Figure 4:
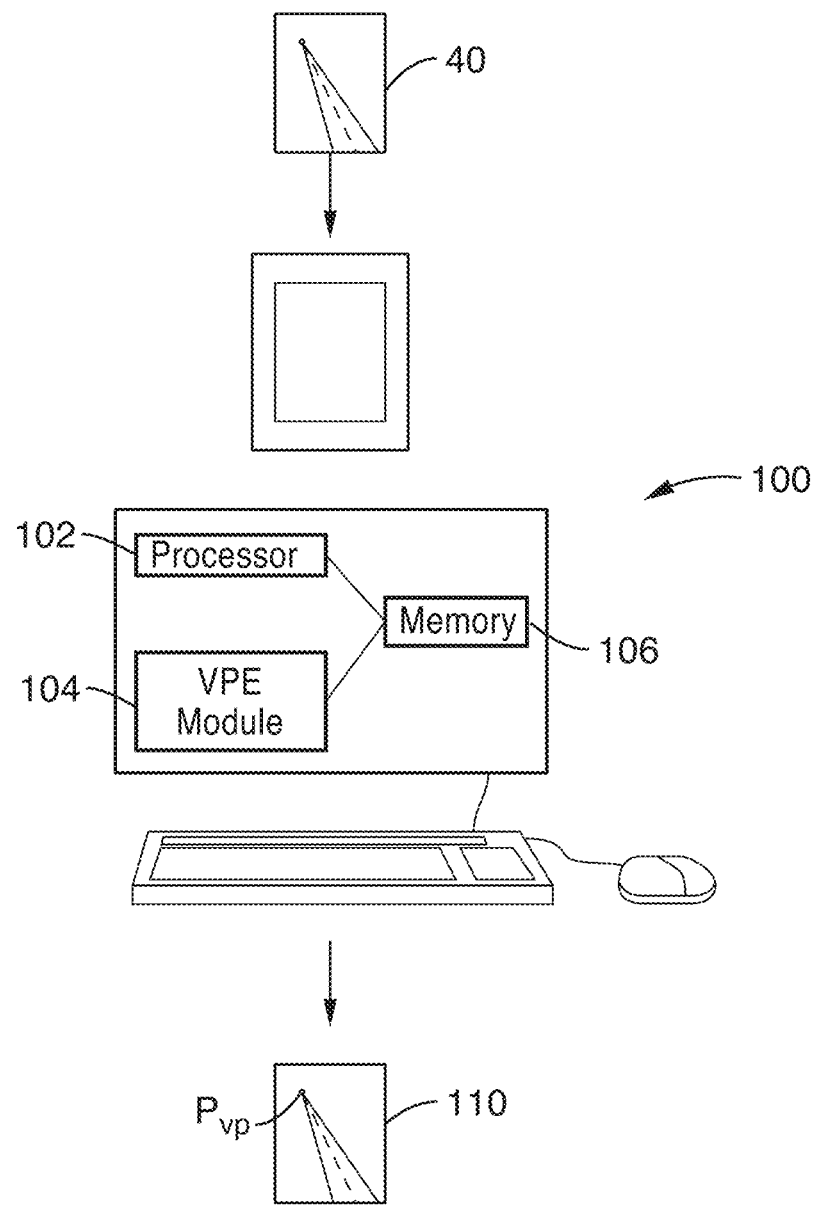
FIG. 4 shows a system for estimating the vanishing point of an image in accordance with the present invention.

FIG. 4 illustrates a system 100 for computing a vanishing point within an image in accordance with the present invention. Raw image 40 is analyzed via processor 102 according to one or more algorithms in VPE (vanishing point estimation) module 104. The VPE module 104 is preferably stored in memory 106. As a result of the processing of the VPE module 104, an image 110 is generated with a calculated vanishing point $P_{vp}$. The calculated vanishing point $P_{vp}$ and image 110 may be stored in memory 106 for further processing. It is appreciated the system 100 may comprise a computer camera, navigation device, or the like device capable of capturing/receiving/inputting the raw image for processing.

Figure 5A:
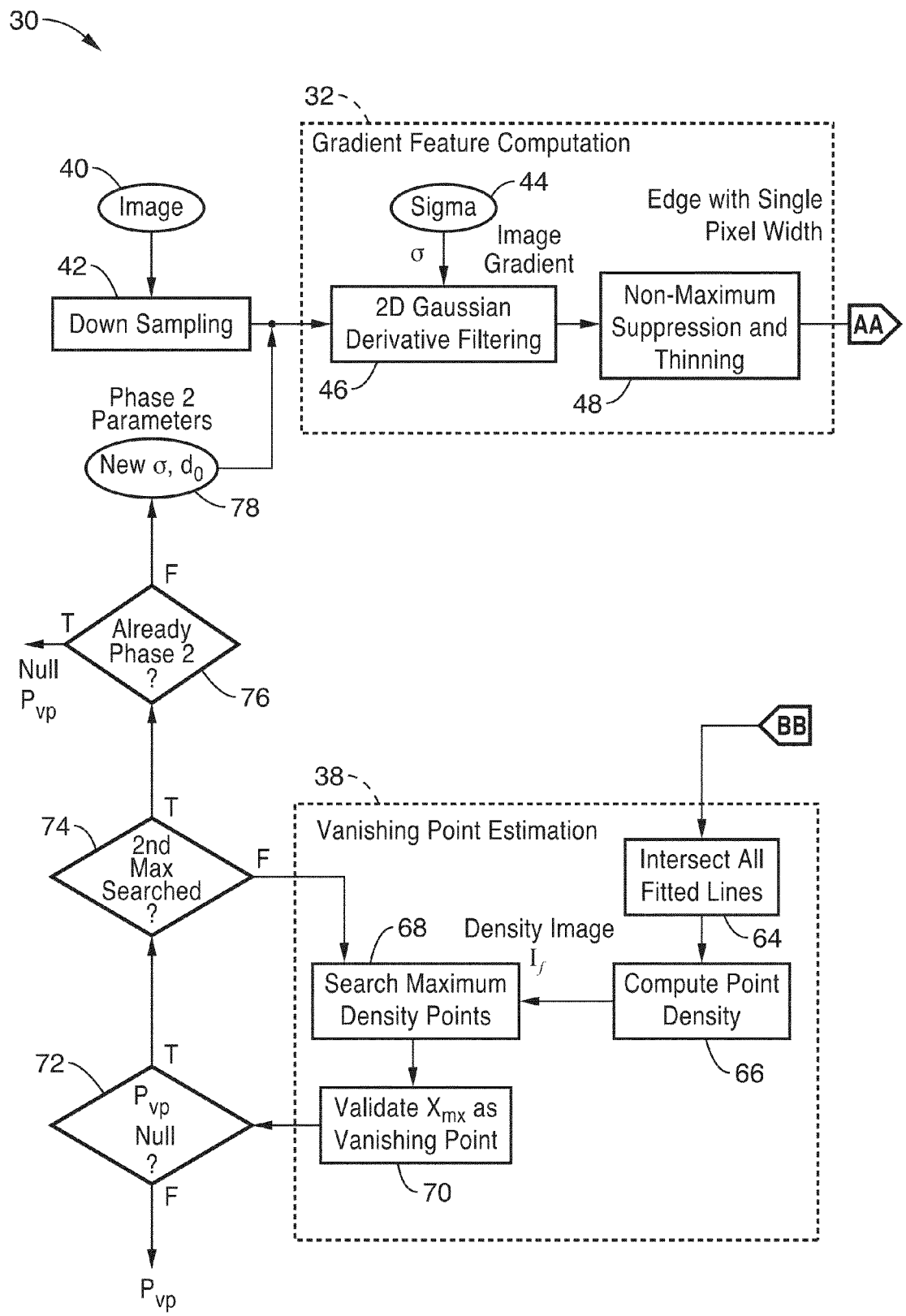
FIGS. 5A and 5B illustrate a detailed schematic diagram of the algorithm of FIG. 3.
Figure 5B:
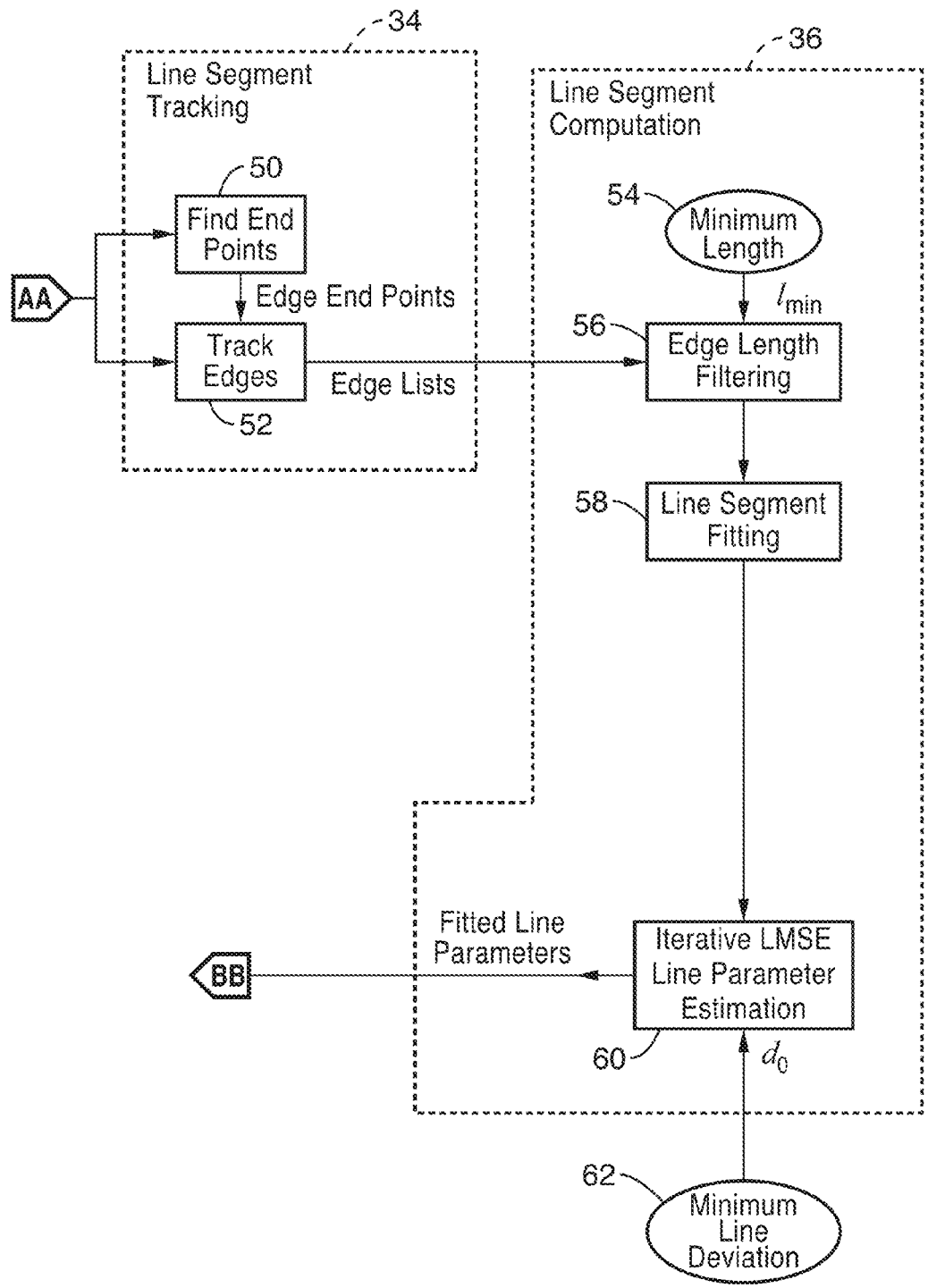

FIGS. 5A and 5B show a detailed schematic diagram of an algorithm 30 for determining vanishing points in an image in accordance with the present invention. Generally, the problem scope parameters are that only one vanishing point needs to be estimated, and only vanishing points within the image frame are considered.

Gradient Feature Computation

Prior to processing via the gradient feature computation module 32, the image 40 is down-sampled at step 42. Down-sampling is performed at a maximum 600 pixels in either length or width using bicubic interpolation, or similar method known in the art.

The edge gradient is preferably detected by Canny edge detection. The image gradient is estimated using 2D derivative Gaussian filtering at step 46. First, the image is processed using the Gaussian convolution and Gaussian smoothing operator of Equation 1 to compute the directional derivative of Gaussian $$\left[\frac{\partial G_\sigma}{\partial x}, \frac{\partial G_\sigma}{\partial y}\right], G_\sigma = \frac{1}{\sqrt{2\pi}\,\sigma} e^{-(x^2+y^2)/2\sigma^2} \qquad (1)$$

where $G_\sigma$ is the shape of the Gaussian and $\sigma$ is the standard deviation of the distribution input at step 44. Typically, for first order computation, $\sigma=1.5$ is input at step 44. For second phase computation, $\sigma$ is typically increased (e.g. $\sigma=3.0$) to broaden the types of lines captured. The gradient magnitude $I_g$ is then computed using Equation 2:

$$I_g(x, y) = \left[\left(\frac{\partial G_\sigma}{\partial x} * I\right)^2 + \left(\frac{\partial G_\sigma}{\partial y} * I\right)^2\right]^{1/2} \qquad (2)$$

where I is the image.

Non-maximum suppression and thinning is then applied at step 48 as a two-step process. First, pixels whose gradient is not locally maximum are suppressed using Equation 3.

$$\tilde{I}_g(x, y) = \begin{cases} I_g(x, y) & \text{if } I_g(x, y) > I_g(x', y') \text{ \& } I_g(x, y) > I_g(x'', y'') \\ 0 & \text{otherwise} \end{cases} \qquad (3)$$

Figure 6:
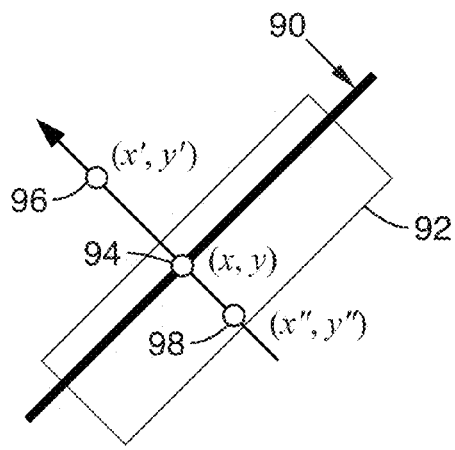
FIG. 6 illustrates non-maximum suppression in accordance with the present invention.

FIG. 6 illustrates non-maximum suppression. The non-zero edge defined by points 94 (x,y), 96 (x',y'), and 98 (x",y") crosses maximum suppression edge 90 within range box 92. In this illustration, point 96 (x',y'), is outside range 92, and is correspondingly suppressed.

Next, hysteresis thresholding is performed so as to give a thin line in the output. A pixel is labeled as "edge" if its gradient is above high threshold. A pixel is labeled as "non-edge" (and thus suppressed) if its gradient is below low threshold. For a pixel between the high and low thresholds, it is labeled as "edge" if connected with an "edge" pixel.

The above thinning estimates single pixel width from double or triple maximum edge points. This hysteresis helps to ensure that noisy edges are not broken up into multiple edge fragments Line Segment Tracking Referring now to FIG. 5B, the output from the gradient feature computation module 32 (edge with single pixel width) is input to the line segment tracking module 34. The single-pixel width edge is used to determine the edge endpoints at step 50, the output of which, along with the edge, used to track edges at step 52.

Figure 7:
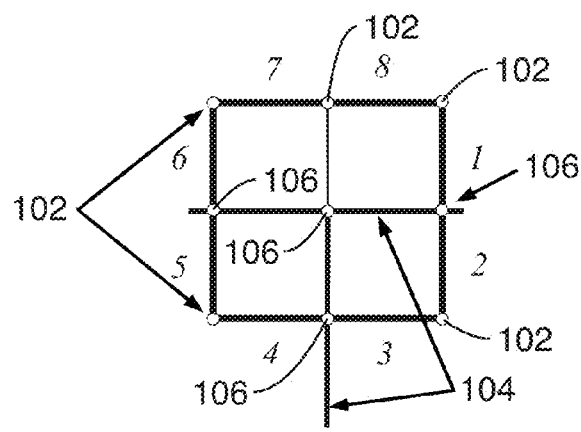
FIG. 7 shows a junction of lines segments for line tracking in accordance with the present invention.

FIG. 7 illustrates the junction of two edge segments 104. In this specific illustration, a "T" junction is displayed (e.g. three line segments wherein one segment abuts into two others) is used. In this example, the junction points included four edge pixels 106 and 5 non-edge pixels 102 indicated by at least six crossovers (1, 2, 3, 4, 5, 6) among eight edges. If this were a crossing junction (+), there wcro would be eight crossovers (1, 2, 3, 4, 5, 6, 7, 8). The segment junctions may be located via a neighborhood look-up table algorithm (e.g. T junction has 3 segments, +junction has 4 segments, etc.). The edges 104 are tracked between junction points 106 by first scanning the gradient image, starting at a non-zero point, and following the edge segment through its neighborhood. Tracking is stopped at the junction. Each segment is assigned a unique id, and the process is iterated until all points are tracked.

Line Segment Computation

The edge lists output from line segment tracking module 34 are then input into line segment computation module 36. First, any edge segment that is short or isolated is removed by edge length filtering step 56. A minimum length $l_{min}$ is input at step 54 and segment length l is computed by Euclidean 2-norm Equation 4:

$$l = [(x'-x'')^2 + (y'-y'')^2]^{1/2} \quad (4)$$

The lines are then filtered at step 56 by minimum length $l/>l_{min}$.

Next, the polylines are fitted by straight line segments at step 58.

At step 60, line segment parameters are estimated using LMSE (least mean square error) fitting to find multiple straight line segments (up to three) for each polyline.

Figure 8:
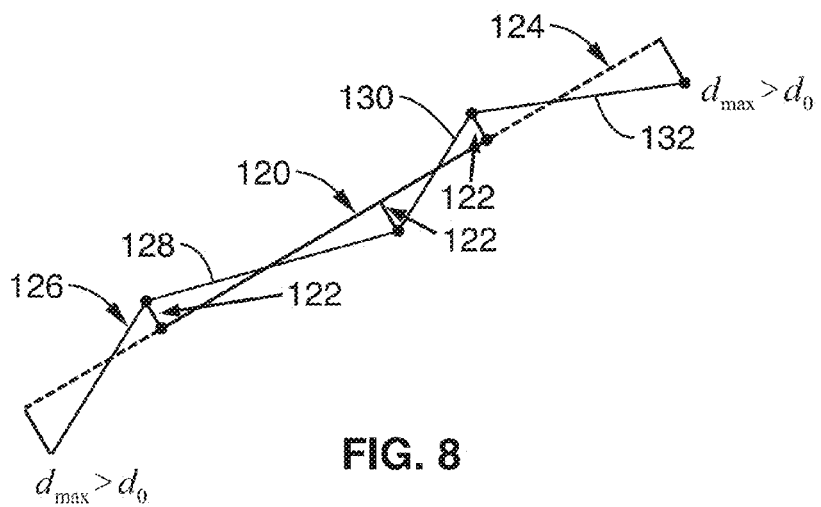
FIG. 8 is an illustration of LMSE line fitting in accordance with the present invention.

FIG. 8 illustrates the process to iteratively fit line segments using LMSE. First, we start with the longest segment and grow in both directions to iteratively fit with LMSE until $d_{max} > d_o$. Where $d_o$ is the minimum line deviation input at step 62, and $d_{max}$ is the distance from the endpoint to the fitted line. Typically $d_o$ is input at $d_o = 1.5$ (Euclidean units in pixels) for first phase computation. As shown in FIG. 8, Line segments 128 and 130 have endpoints that have a $d_{max}$ 122 is less than $D_o$, and thus are fit to form fitted line 120. Lines 126 and 132 have endpoints resulting in $d_{max} > d_o$, and thus are not part of the LMSE fitted line 120 (along with dashed segment 124). Step 60 returns multiple straight LMSE lines (up to three) for each polyline with multiple line segments.

Vanishing Point Estimation

Referring back to FIG. 5A, the fitted line parameters output from the line segment computation module 36 are then input into the vanishing point estimation module 38.

Figure 9:
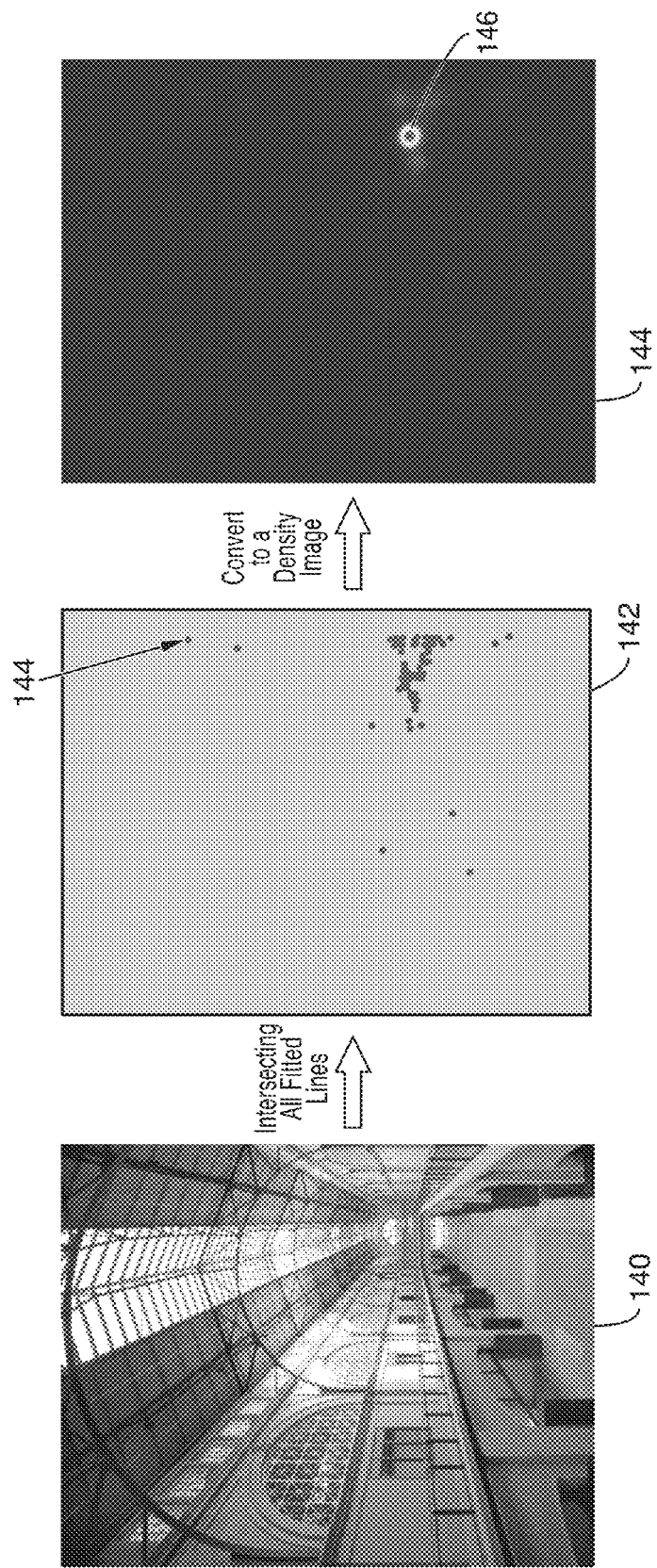
FIG. 9 illustrates conversion of an image to a density image in accordance with the present invention.

At step 64, all the LMSE fitted lines are intersected to find intersecting points $p_i$. Next the point density is estimated as a continuous function of image coordinates. The intersecting points are converted to a density image at step 66 using Equation 5 to create density image $I_f$:

$$f(x) = G_{\sigma_w}(x) * \sum_i \delta(x - p_i) \quad (5)$$

where $$\sum_i \delta(x - p_i)$$

corresponds to the image 142 in FIG. 9. The Gaussian $G_\sigma(x)$ is computed using the convolution Equation 6 below.

$$f(x) = G_\sigma(x) * \sum_i \delta(x - p_i), \; G_\sigma(x) = \frac{1}{\sqrt{2\pi}\,\sigma_w} e^{-(x^2+y^2)/2\sigma_w^2} \quad (6)$$

FIG. 9 illustrates an image 140 being converted via step 64 to a series of intersecting points $p_i$ (144) at image 142. Points 144 are then used to generate density image 144.

Next, the maximum density point 146 is found at step 68 as a distance-weighed average of vanishing point $X_{mx}$ using Equation 7:

$$x_{mx} = \underset{x \in I_f}{\arg\max} f(x). \quad (7)$$

Figure 10:
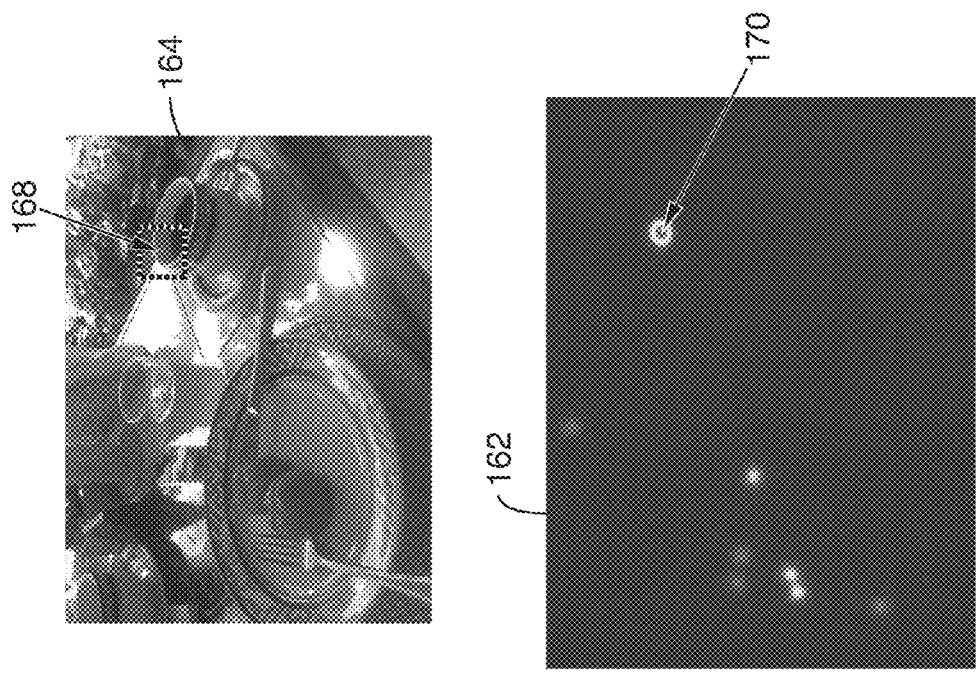
FIG. 10 illustrates parallel edges in an image contributing to a false estimation point.
Figure 10:
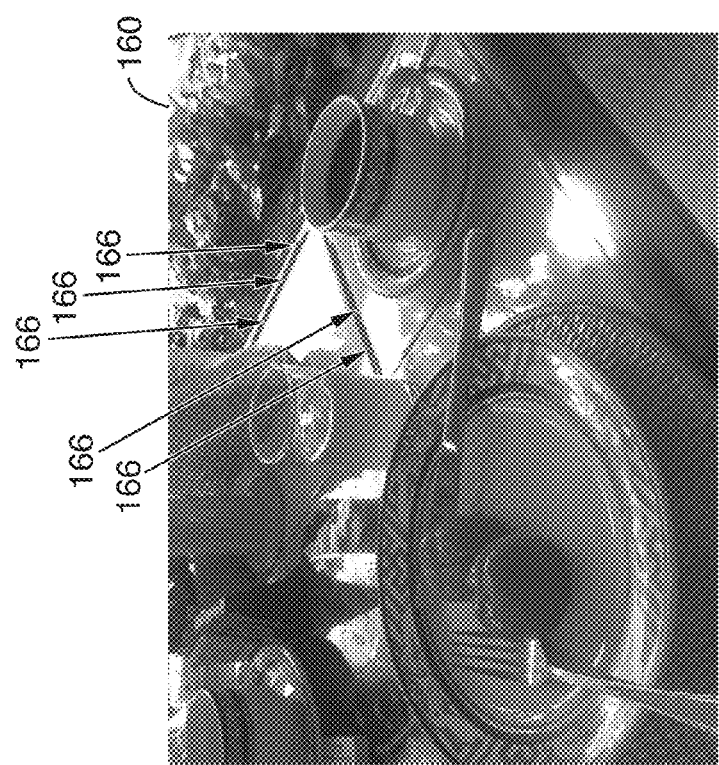

At step 70 $X_{mx}$ is validated as a vanishing point. For validation, the algorithm locates all the parallel groups of lines in a window around the estimated vanishing point and represents the group using a single line. Closely spaced parallel lines often cause false vanishing point detection by intersecting within close range. Parallel lines can be detected during validating stage and invalidate the false vanishing point. This is illustrated in FIG. 10, where the closely spaced lines 166 in image 160 contributed to false estimation point 168 in image 164 and distance-weighed density point 170 in image 162.

Step 70 specifies a threshold number of intersection points (e.g. nine) to validate the current vanishing point in the area where distance-weighed density is computed.

At step 72, the algorithm tests whether there was no vanishing point found ($P_{vp}$ null). If no (e.g. a vanishing point was calculated), $P_{vp}$ is output. If yes, the algorithm tests if the second maximum point has already been searched at step 74. If not, it searches the second maximum point at step 68 for the density image and revalidates as step 70.

If the answer at step 74 is yes, the algorithm tests at step 76 if the process is already at phase 2 (e.g. a second pass has been performed). If yes, the algorithm stops indicating $P_{vp}$ being null (no vanishing point found). Note that the process may also be repeated for a third phase if so desired. If the answer at step 74 is no (only one phase done), the algorithm estimates a new vanishing point using new set of parameters $\sigma$, $D_o$ at step 78. For example a larger σ may be used for finding coarser lines, and a larger $d_o$ may be used for more tolerance for non-straight lines.

Figure 11:
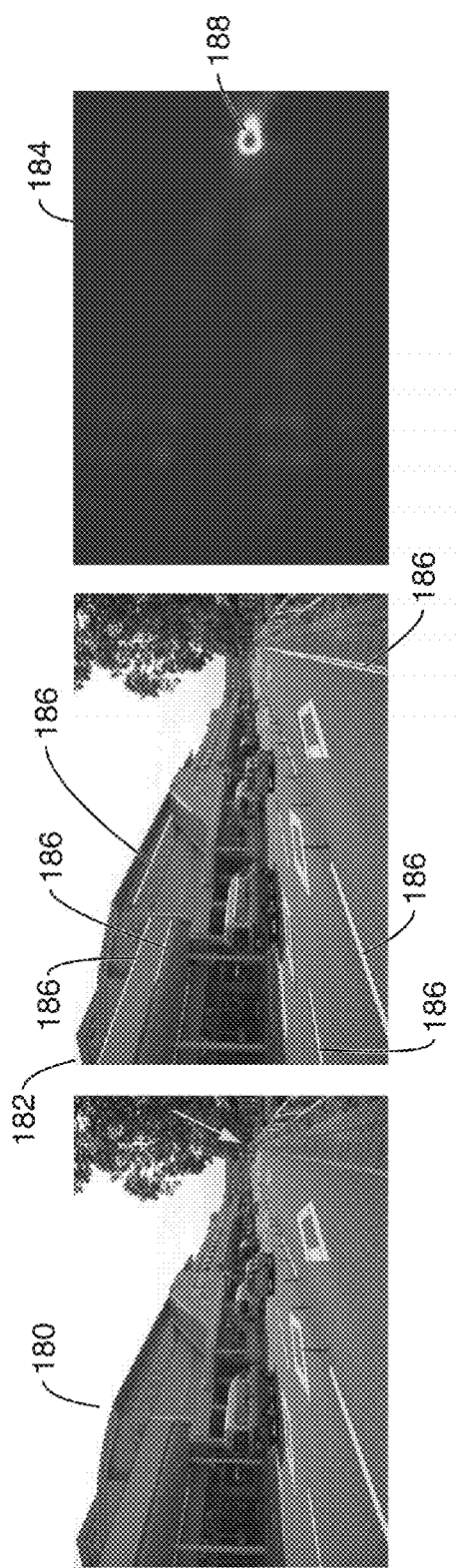
FIG. 11 shows exemplary results of the vanishing point estimation algorithm of the present invention applied to a sample image.
Figure 12:
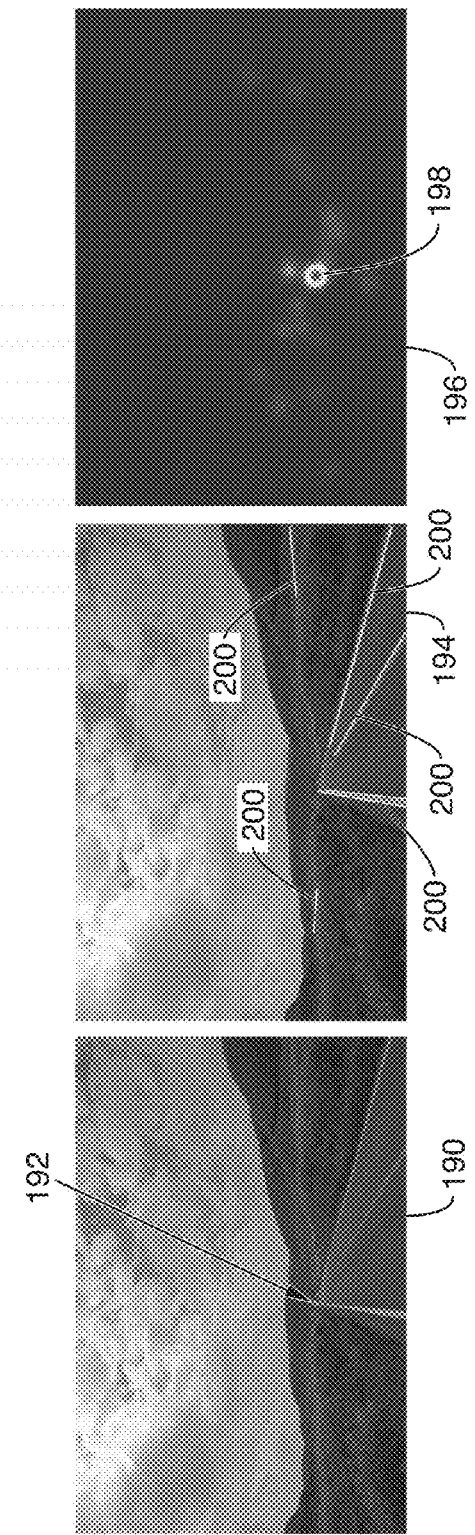
FIG. 12 shows exemplary results of the vanishing point estimation algorithm of the present invention applied to another sample image.
Figure 13:
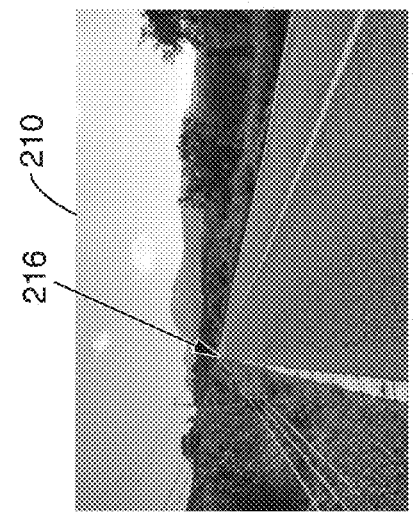
FIG. 13 shows exemplary results of the vanishing point estimation algorithm of the present invention applied to yet another sample image.
Figure 13:
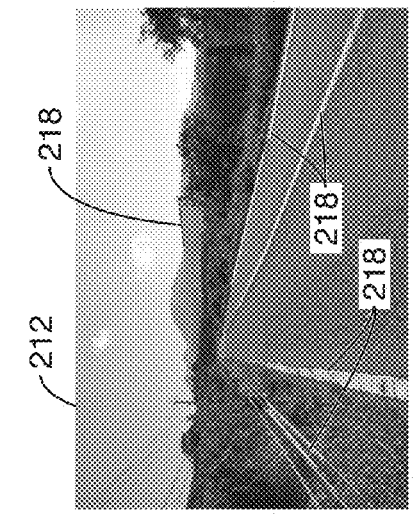
Figure 13:
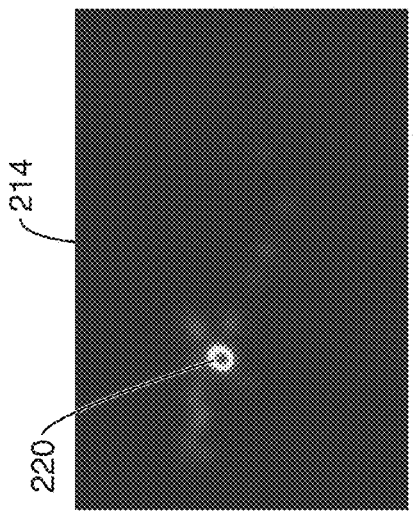
Figure 14:
FIG. 14 shows exemplary results of the vanishing point estimation algorithm of the present invention applied to another sample image.
Figure 14:
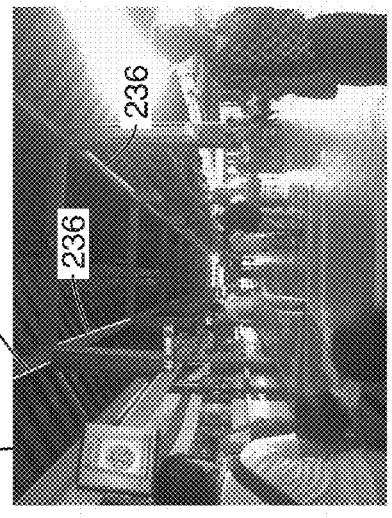
Figure 14:
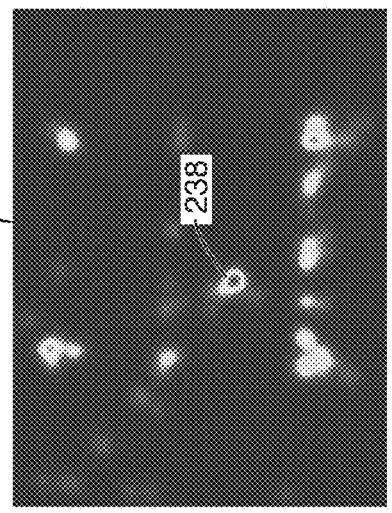

FIG. 11 through FIG. 14 illustrate results for the system of the present invention for various images. The original image 180 in FIG. 11 is processed to find line segments 186 in the second image 182, with further processing to find vanishing point 188 in image 184. The original image 190 in FIG. 12 (showing vanishing point of road 192) is processed to find line segments 200 in second image 194, with further processing to find vanishing point 198 in image 196. The original image 210 in FIG. 13 (showing vanishing point of road 216) is processed to find line segments 218 in second image 212, with further processing to find vanishing point 220 in image 214. The original image 230 in FIG. 14 is processed to find line segments 236 in second image 232, with further processing to find vanishing point 238 in image 234.

Figure 15:
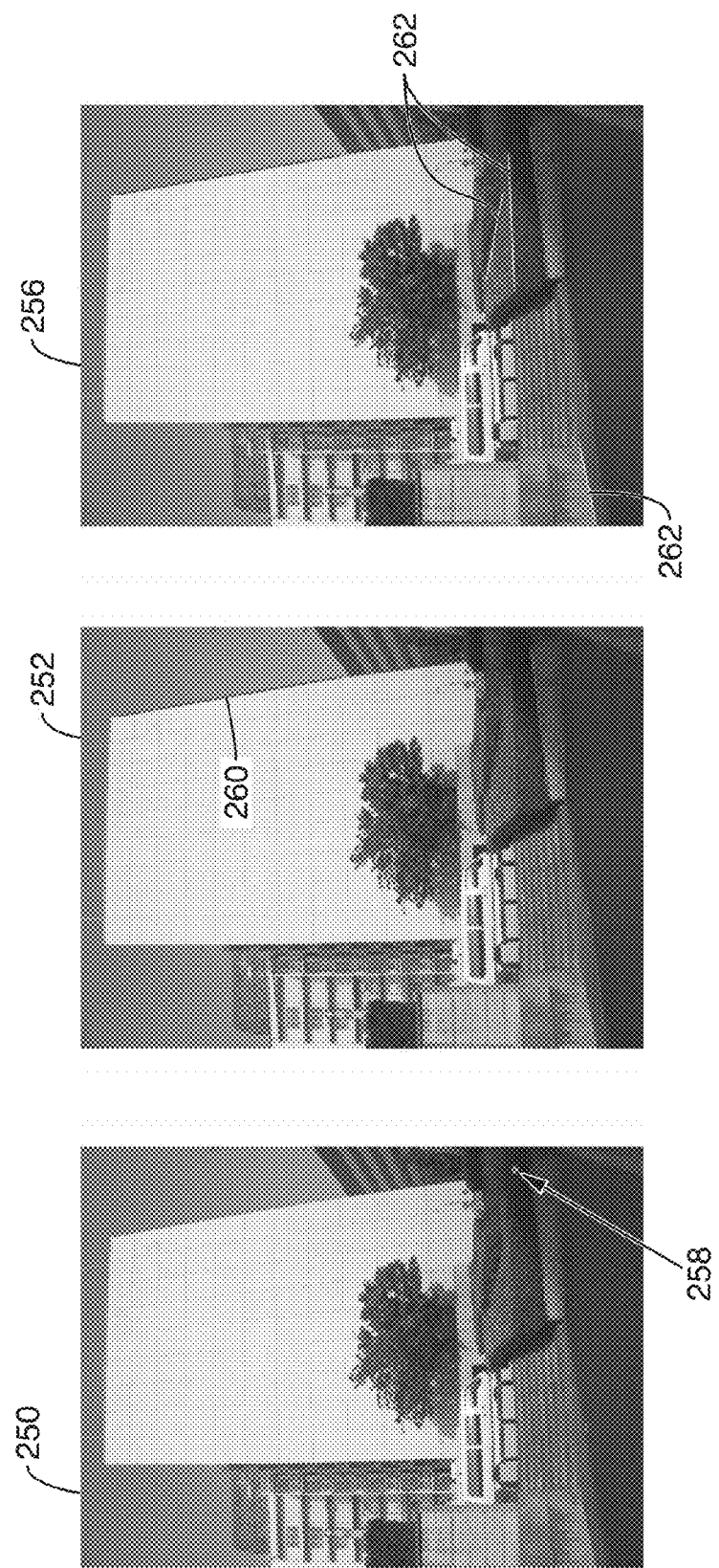
FIG. 15 illustrates exemplary results of the of the vanishing point estimation algorithm of the present invention applied to an image having parallel lines.

FIG. 15 illustrates an image 250 where a false vanishing point 258 is first found due to parallel line segments. The second image 252 illustrates parallel lines 260 that contribute to the false vanishing point 258. The third image 256 shows lines 262 used for vanishing point estimation after taking out parallel lines (e.g. via validation step 70) to remove the false vanishing point.

Figure 16:
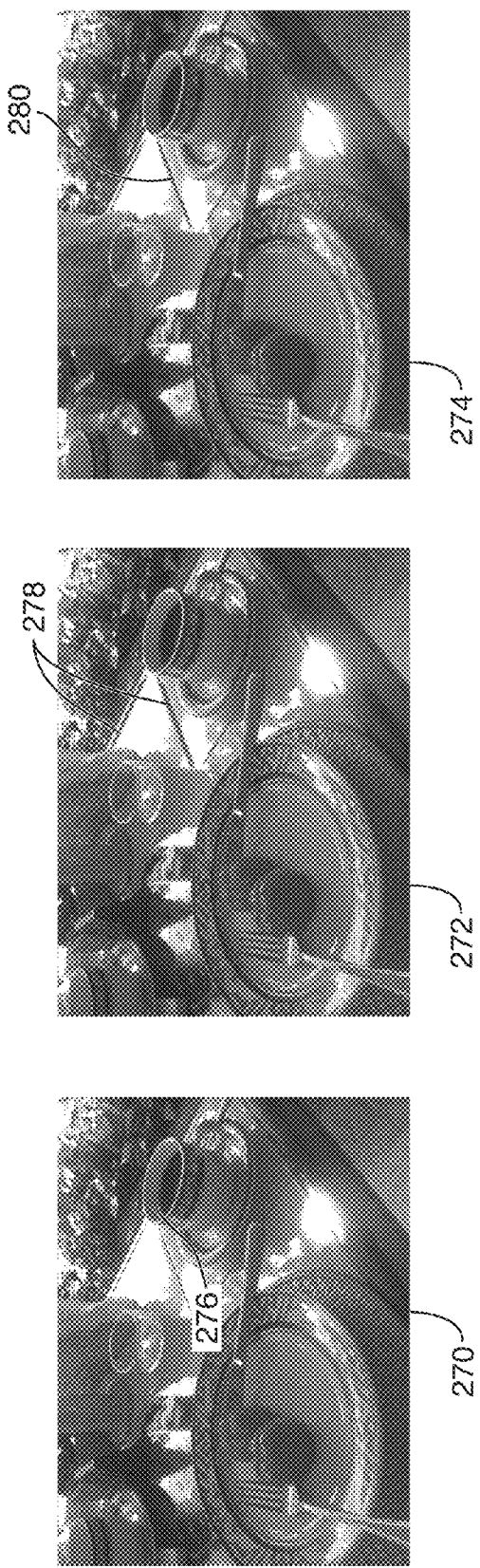
FIG. 16 illustrates exemplary results of the of the vanishing point estimation algorithm of the present invention applied to another image having parallel lines.

FIG. 16 illustrates another image 270 where a false vanishing point 276 is first found due to parallel line segments. The second image 272 illustrates parallel lines 278 that contribute to the false vanishing point 276. The third image 274 shows lines 280 used for vanishing point estimation after taking out parallel lines (e.g. via validation step 70) to remove the false vanishing point.

In summary, the primary vanishing point may be estimated from sufficient line segment cues in the image. The methods of the present invention are efficient to compute on sparse set of lines with imposed constraints. Accuracy is generally determined by the quality of line segments in the image. It can be measured by the spread around maximum density point. The maximum density point is generally accurate, if validated.

Embodiments of the present invention are described with reference to flowchart illustrations of methods and systems according to embodiments of the invention. These methods and systems can also be implemented as computer program products. In this regard, each block or step of a flowchart, and combinations of blocks (and/or steps) in a flowchart, can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts support combinations of means for performing the specified functions, combinations of steps for performing the specified functions, and computer program instructions, such as embodied in computer-readable program code logic means, for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s).

As can be seen, therefore, the present invention includes the following inventive embodiments among others:

1. A system for estimating a vanishing point within an image, comprising: (a) a processor configured for processing pixels of an image; and (b) programming executable on said processor for performing operations comprising: (i) computing line segment estimation of one or more lines in said image; (ii) wherein one or more of said lines comprise multiple line segments as a single least-mean-square-error (LMSE) fitted line; (iii) representing said one or more lines having multiple line segments as a single least-mean-square-error (LMSE) fitted line; and (iv) intersecting the one or more lines to locate a vanishing point in a density space.

2. A system as recited in embodiment 1, wherein said programming performs operations further comprising: (v) validating the vanishing point.

3. A system as recited in embodiment 2, wherein said programming performs operations further comprising: (vi) performing a second phase computation to correct for ill-defined and coarse lines.

4. A system as recited in embodiment 3, wherein said programming performs operations further comprising: (vii) generating a modified image file containing said vanishing point.

5. A system as recited in embodiment 1, wherein the programming is configured to compute line segment estimation by: computing an edge gradient magnitude of the image; performing non-maximum suppression of the edge gradient to generate one or more edges having a single pixel width; finding the endpoints of said edges and tracking said edges; and filtering the lines associated with said edges based on a predetermined minimum length.

6. A system as recited in embodiment 3, wherein the programming is configured to allow input of a minimum line deviation to adjust the tolerance for non-straight lines.

7. A system as recited in embodiment 6, wherein the programming is configured to allow input of a distribution standard deviation for computation of said image gradient to adjust the tolerance for non-straight lines.

8. A system as recited in embodiment 6, wherein the second phase computation comprises inputting different values for the minimum line deviation and/or distribution standard deviation.

9. A system as recited in embodiment 1, wherein locating the vanishing point comprises: computing a point density from the intersected lines; and searching for one or more maximum density points.

10. A system as recited in embodiment 9, wherein said programming performs operations further comprising generating a density image according to the equation:

$$f(x) = G_{\sigma_x}(x) * \sum_i \delta(x - p_i).$$

11. A system as recited in embodiment 9, wherein searching for one or more maximum density points is computed according to the equation:

$$x_{mx} = \underset{x \in I_f}{\operatorname{argmax}} f(x)$$

where $X_{mx}$ is the estimated vanishing point.

12. A system as recited in embodiment 2, wherein validating the vanishing point comprising locating one or more parallel groups of lines in a window around the estimated vanishing point and representing the one or more groups using single line.

13. A method for estimating a vanishing point within an image, comprising: (a) inputting an image into a memory module, the memory module coupled to a processor; (b) detecting a vanishing point within the image with said processor according to steps comprising: (i) computing line segment estimation of one or more lines in said image; (ii) wherein one or more of said lines comprise multiple line segments as a single least-mean-square-error (LMSE) fitted line; (iii) representing said one or more lines having multiple line segments as a single least-mean-square-error (LMSE) fitted line; and (iv) intersecting the one or more lines to locate a vanishing point in a density space.

14. A method as recited in embodiment 13, further comprising: (v) validating the vanishing point.

15. A method as recited in embodiment 14, further comprising: (vi) performing a second phase computation to correct for ill-defined and coarse lines.

16. A method as recited in embodiment 15, further comprising: (vii) generating a modified image file of containing said vanishing point.

17. A method as recited in embodiment 13, wherein computing line segment estimation comprises: computing an edge gradient magnitude of the image; performing non-maximum suppression of the edge gradient to generate one or more edges having a single pixel width; finding the endpoints of said edges and tracking said edges; and filtering the lines associated with said edges based on a predetermined minimum length.

18. A method as recited in embodiment 15, further comprising: inputting a minimum line deviation to adjust the tolerance for non-straight lines.

19. A method as recited in embodiment 18, further comprising: inputting a distribution standard deviation for computation of said image gradient to adjust the tolerance for non-straight lines.

20. A method as recited in embodiment 18, wherein the second phase computation comprises inputting different values for the minimum line deviation and/or distribution standard deviation.

21. A method as recited in embodiment 13, wherein locating the vanishing point comprises: computing a point density from the intersected lines; and searching for one or more maximum density points.

22. A method as recited in embodiment 21, further comprising generating a density image according to the equation:

$$f(x) = G_{\sigma_w}(x) * \sum_i \delta(x - p_i).$$

23. A method as recited in embodiment 21, wherein searching for one or more maximum density points is computed according to the equation:

$$x_{mx} = \underset{x \in I_f}{\operatorname{argmax}} f(x)$$

where $X_{mx}$ is the estimated vanishing point.

24. A method as recited in embodiment 14, wherein validating the vanishing point comprising locating one or more parallel groups of lines in a window around the estimated vanishing point and representing the one or more groups using single line.

25. An apparatus for estimating a vanishing point within an image, comprising: (a) a processor configured for processing pixels of an image; and (b) programming executable on said processor for performing operations comprising: (i) computing an edge gradient magnitude of the image; (ii) performing non-maximum suppression of the edge gradient to generate one or more edges having a single pixel width; (iii) finding the endpoints of said edges and tracking said edges; and (iv) filtering the lines associated with said edges based on a predetermined minimum length; (v) wherein one or more of said lines comprise multiple line segments as a single least-mean-square-error (LMSE) fitted line; (vi) representing said one or more lines having multiple line segments as a single least-mean-square-error (LMSE) fitted line; (vii) intersecting the one or more lines; (viii) computing a point density from the intersected lines; and (ix) searching for one or more maximum density points.

26. An apparatus as recited in embodiment 25, wherein said programming performs operations further comprising: (x) validating the vanishing point comprising locating one or more parallel groups of lines in a window around the estimated vanishing point and representing the one or more groups using a single line.

27. An apparatus as recited in embodiment 25, wherein said programming performs operations further comprising generating a density image according to the equation:

$$f(x) = G_{\sigma_w}(x) * \sum_i \delta(x - p_i).$$

28. An apparatus as recited in embodiment 26, wherein searching for one or more maximum density points is computed according to the equation:

$$x_{mx} = \underset{x \in I_f}{\operatorname{argmax}} f(x)$$

where $X_{mx}$ is the estimated vanishing point.

29. An apparatus as recited in embodiment 25, wherein the programming is configured to allow input of a minimum line deviation to adjust the tolerance for non-straight lines.

30. An apparatus as recited in embodiment 29, wherein the programming is configured to allow input of a distribution standard deviation for computation of said image gradient to adjust the tolerance for non-straight lines.

31. An apparatus as recited in embodiment 30, further comprising performing a second phase computation comprising inputting different values for the minimum line deviation and/or distribution standard deviation.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A system for estimating a vanishing point within an image, comprising:
   (a) a processor configured for processing pixels of an image; and
   (b) programming executable on said processor for performing operations comprising:
      (i) computing line segment estimation of one or more lines in said image;
      (ii) wherein one or more of said lines comprise multiple line segments as a single least-mean-square-error (LMSE) fitted line;
      (iii) representing said one or more lines having multiple line segments as a single least-mean-square-error (LMSE) fitted line; and
      (iv) intersecting the one or more lines to estimate a vanishing point in a density space; and
      (v) validating the estimated vanishing point by locating one or more parallel groups of lines in a window around the estimated vanishing point and representing the one or more groups using a single line.

2. A system as recited in claim 1, wherein said programming performs operations further comprising:
   (vi) performing a second phase computation to correct for ill-defined and coarse lines.

3. A system as recited in claim 2, wherein said programming performs operations further comprising:
   (vii) generating a modified image file containing said vanishing point.

4. A system as recited in claim 1, wherein the programming is configured to compute line segment estimation by:
   computing an edge gradient magnitude of the image;
   performing non-maximum suppression of the edge gradient to generate one or more edges having a single pixel width;
   finding the endpoints of said edges and tracking said edges; and
   filtering the lines associated with said edges based on a predetermined minimum length.

5. A system as recited in claim 2, wherein the programming is configured to allow input of a minimum line deviation to adjust the tolerance for non-straight lines.

6. A system as recited in claim 5, wherein the programming is configured to allow input of a standard deviation distribution for computation of said image gradient to adjust the tolerance for non-straight lines.

7. A system as recited in claim 5, wherein the second phase computation comprises inputting different values for the minimum line deviation and/or standard deviation distribution.

8. A system as recited in claim 1, wherein locating the vanishing point comprises:
   computing a point density from the intersected lines; and
   searching for one or more maximum density points.

9. A system as recited in claim 8, wherein said programming performs operations further comprising generating a density image according to the equation:

$$f(x) = G_{\sigma_w}(x) * \sum_i \delta(x - p_i).$$

10. A system as recited in claim 8, wherein searching for one or more maximum density points is computed according to the equation:

$$x_{mx} = \underset{x \in I_f}{\operatorname{argmax}} f(x)$$

where $X_{mx}$ is the estimated vanishing point.

11. A method for estimating a vanishing point within an image, comprising:
   (a) inputting an image into a memory module, the memory module coupled to a processor;
   (b) detecting a vanishing point within the image with said processor according to steps comprising:
      (i) computing line segment estimation of one or more lines in said image;
      (ii) wherein one or more of said lines comprise multiple line segments as a single least-mean-square-error (LMSE) fitted line
      (iii) representing said one or more lines having multiple line segments as a single least-mean-square-error (LMSE) fitted line; and
      (iv) intersecting the one or more lines to estimate a vanishing point in a density space; and
      (v) validating the estimated vanishing point comprising locating one or more parallel groups of lines in a window around the estimated vanishing point and representing the one or more groups using a single line.

12. A method as recited in claim 11, further comprising:
   (vi) performing a second phase computation to correct for ill-defined and coarse lines.

13. A method as recited in claim 12, further comprising:
   (vii) generating a modified image file containing said validated vanishing point.

14. A method as recited in claim 11, wherein computing line segment estimation comprises:
   computing an edge gradient magnitude of the image;
   performing non-maximum suppression of the edge gradient to generate one or more edges having a single pixel width;
   finding the endpoints of said edges and tracking said edges; and
   filtering the lines associated with said edges based on a predetermined minimum length.

15. A method as recited in claim 12, further comprising:
   inputting a minimum line deviation to adjust the tolerance for non-straight lines.

16. A method as recited in claim 15, further comprising:
inputting a distribution standard deviation for computation of said image gradient to adjust the tolerance for non-straight lines.

17. A method as recited in claim 15, wherein the second phase computation comprises inputting different values for the minimum line deviation and/or distribution standard deviation.

18. A method as recited in claim 11, wherein estimating the vanishing point comprises:
computing a point density from the intersected lines; and
searching for one or more maximum density points.

19. A method as recited in claim 18, further comprising generating a density image according to the equation:

$$f(x) = G_{\sigma_w}(x) * \sum_i \delta(x - p_i).$$

20. A method as recited in claim 18, wherein searching for one or more maximum density points is computed according to the equation:

$$x_{mx} = \underset{x \in I_f}{\mathrm{argmax}} f(x)$$

where $X_{mx}$ is the estimated vanishing point.

21. An apparatus for estimating a vanishing point within an image, comprising:
(a) a processor configured for processing pixels of an image; and
(b) programming executable on said processor for performing operations comprising:
(i) computing an edge gradient magnitude of the image;
(ii) performing non-maximum suppression of the edge gradient to generate one or more edges having a single pixel width;
(iii) finding the endpoints of said edges and tracking said edges; and
(iv) filtering the lines associated with said edges based on a predetermined minimum length;
(v) wherein one or more of said lines comprise multiple line segments as a single least-mean-square-error (LMSE) fitted line;
(vi) representing said one or more lines having multiple line segments as a single least-mean-square-error (LMSE) fitted line;
(vii) intersecting the one or more lines;
(viii) computing a point density from the intersected lines; and
(ix) estimating a vanishing point by searching for one or more maximum density points; and
(x) validating the estimated vanishing point by locating one or more parallel groups of lines in a window around the estimated vanishing point and representing the one or more groups using a single line.

22. An apparatus as recited in claim 21, wherein said programming performs operations further comprising generating a density image according to the equation:

$$f(x) = G_{\sigma_w}(x) * \sum_i \delta(x - p_i).$$

23. An apparatus as recited in claim 21, wherein searching for one or more maximum density points is computed according to the equation:

$$x_{mx} = \underset{x \in I_f}{\mathrm{argmax}} f(x)$$

where $X_{mx}$ is the estimated vanishing point.

24. An apparatus as recited in claim 21, wherein the programming is configured to allow input of a minimum line deviation to adjust the tolerance for non-straight lines.

25. An apparatus as recited in claim 24, wherein the programming is configured to allow input of a distribution standard deviation for computation of said image gradient to adjust the tolerance for non-straight lines.

26. An apparatus as recited in claim 25, wherein said programming performs operations further comprising performing a second phase computation comprising inputting different values for the minimum line deviation and/or distribution standard deviation.

* * * * *